(12) United States Patent
Shah et al.

(10) Patent No.: US 12,078,979 B1
(45) Date of Patent: Sep. 3, 2024

(54) STOWING OF PHOTOVOLTAIC (PV) MODULES IN RESPONSE TO WEATHER EVENT FORECASTS

(71) Applicant: ARRAY TECH, INC., Albuquerque, NM (US)

(72) Inventors: Sanket Shah, Round Rock, TX (US); Kyumin Lee, Albuquerque, NM (US); Kiran Vasishta, Albuquerque, NM (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/352,159

(22) Filed: Jul. 13, 2023

(51) Int. Cl.
*G05B 19/4155* (2006.01)
*F24S 20/00* (2018.01)
*H02S 30/20* (2014.01)
*H02S 40/12* (2014.01)

(52) U.S. Cl.
CPC .......... *G05B 19/4155* (2013.01); *F24S 20/00* (2018.05); *H02S 30/20* (2014.12); *G05B 2219/37283* (2013.01); *H02S 40/12* (2014.12)

(58) Field of Classification Search
None
See application file for complete search history.

(56) References Cited

U.S. PATENT DOCUMENTS

| | | | |
|---|---|---|---|
| 6,662,801 B2 | 12/2003 | Hayden et al. | |
| 8,297,273 B2 | 10/2012 | Chyou et al. | |
| 8,578,929 B2 | 11/2013 | Krabbe et al. | |
| 8,933,660 B2 | 1/2015 | Heumann et al. | |
| 10,627,136 B2 | 4/2020 | Ziegler et al. | |
| 10,651,782 B2 | 5/2020 | Patnude | |
| 11,437,949 B2* | 9/2022 | Creasy | H02S 50/10 |
| 11,469,707 B2* | 10/2022 | Shah | H02S 20/30 |
| 11,632,074 B2* | 4/2023 | LoBue | F24S 30/425 |
| | | | 136/246 |

(Continued)

FOREIGN PATENT DOCUMENTS

| | | |
|---|---|---|
| CN | 201122915 Y | 9/2008 |
| CN | 201247413 Y | 5/2009 |

(Continued)

OTHER PUBLICATIONS

European Patent Office; International Search Report and Written Opinion issued in Int'l App No. PCT/US2023/028928, dated Feb. 21, 2024.

*Primary Examiner* — Edelmira Bosques
*Assistant Examiner* — Deepak A Deean
(74) *Attorney, Agent, or Firm* — MASCHOFF BRENNAN (57) ABSTRACT

Methods and systems stowing one or more photovoltaic (PV) modules based on a weather event forecasts are provided. In one embodiment, a method may include receiving a weather event forecast, such as a snow event forecast, for a location of a tracking system that includes a plurality of PV modules, determining that the weather event forecast for the location of the tracking system exceeds a threshold level of severity, and automatically positioning the plurality of PV modules at the location of the tracking system into a stow configuration. In some embodiments, the method may further require receiving confirmation of the weather event from a sensor at the location of the tracking system before positioning the PV modules in the stow configuration.

11 Claims, 6 Drawing Sheets

(56) References Cited

U.S. PATENT DOCUMENTS

| | | | |
|---|---|---|---|
| 2010/0051086 | A1 | 3/2010 | Keshner et al. |
| 2011/0155218 | A1 | 6/2011 | Buchel et al. |
| 2012/0109381 | A1 | 5/2012 | Choi et al. |
| 2012/0159596 | A1* | 6/2012 | Vandevelde ...... H01L 31/02021 726/3 |
| 2013/0048048 | A1 | 2/2013 | Flanery et al. |
| 2013/0133641 | A1 | 5/2013 | Shvets |
| 2013/0206708 | A1 | 8/2013 | Lessard |
| 2014/0209146 | A1 | 7/2014 | Park et al. |
| 2016/0056754 | A1 | 2/2016 | Kitayama |
| 2017/0070187 | A1 | 3/2017 | Jain et al. |
| 2018/0054156 | A1 | 2/2018 | Lokey |
| 2018/0102733 | A1 | 4/2018 | Kakalia |
| 2018/0358921 | A1 | 12/2018 | Henderson et al. |
| 2020/0036325 | A1* | 1/2020 | Poivet ............ H02S 30/20 |
| 2020/0083838 | A1 | 3/2020 | Sgarrella |
| 2020/0162015 | A1 | 5/2020 | Upfill-Brown et al. |
| 2020/0182513 | A1 | 6/2020 | Ma et al. |
| 2020/0355846 | A1* | 11/2020 | Mecikalski ........... G01W 1/02 |
| 2021/0080980 | A1* | 3/2021 | Kesler ............ H02S 20/32 |
| 2021/0103302 | A1* | 4/2021 | Lee ............... F24S 50/20 |
| 2021/0103303 | A1* | 4/2021 | Sharp ............. G01S 3/7861 |
| 2021/0194417 | A1* | 6/2021 | Sharpe ............ G05D 3/105 |
| 2021/0399670 | A1* | 12/2021 | Herwood ......... H02S 20/32 |
| 2022/0123689 | A1* | 4/2022 | Creasy ............. H02S 50/10 |
| 2022/0149770 | A1* | 5/2022 | Paulus .............. F03D 9/007 |
| 2022/0224281 | A1* | 7/2022 | LoBue ............ H02S 20/32 |
| 2022/0224282 | A1* | 7/2022 | LoBue ............ H02S 40/30 |
| 2022/0294387 | A1* | 9/2022 | Shah ................ G01W 1/10 |
| 2023/0275541 | A1* | 8/2023 | Ros Gómez ........ H02S 20/32 250/203.4 |

FOREIGN PATENT DOCUMENTS

| | | | |
|---|---|---|---|
| CN | 101718996 A | 6/2010 | |
| CN | 102566588 A | 7/2012 | |
| CN | 101943917 B | 11/2012 | |
| CN | 101644933 B | 12/2012 | |
| CN | 103472858 A | 12/2013 | |
| CN | 102841607 B | 10/2014 | |
| CN | 104601095 A | 5/2015 | |
| CN | 104656681 A | 5/2015 | |
| CN | 105790692 A | 7/2016 | |
| CN | 205647384 U | 10/2016 | |
| CN | 206272300 U | 6/2017 | |
| CN | 107171627 A | 9/2017 | |
| CN | 104714561 B | 2/2018 | |
| CN | 108183665 A | 6/2018 | |
| CN | 108418546 A | 8/2018 | |
| CN | 108428757 A | 8/2018 | |
| CN | 106849853 B | 11/2018 | |
| CN | 109002593 A | 12/2018 | |
| CN | 109491411 A | 3/2019 | |
| CN | 108347221 B | 9/2019 | |
| CN | 209517026 U | 10/2019 | |
| CN | 210016434 U | 2/2020 | |
| CN | 210405192 U | 4/2020 | |
| CN | 109787544 B | 6/2020 | |
| CN | 211860041 U | 11/2020 | |
| CN | 112099536 A | 12/2020 | |
| CN | 212749632 U | 3/2021 | |
| CN | 112648156 A | 4/2021 | |
| CN | 112713853 A | 4/2021 | |
| CN | 112769380 A | 5/2021 | |
| DE | 102005013334 A1 | 9/2006 | |
| DE | 102005044524 B4 | 4/2009 | |
| DE | 202010005508 U1 | 9/2010 | |
| EP | 3847746 A1 | 7/2021 | |
| ES | 2219184 B1 | 1/2006 | |
| ES | 2363393 A1 | 8/2021 | |
| FR | 2489595 A1 | 3/1982 | |
| IN | 202121005119 A | 2/2021 | |
| IN | 202141029699 A | 7/2021 | |
| JP | 2009176842 A | 8/2009 | |
| JP | 2012195548 A | 10/2012 | |
| JP | 2014022658 A | 2/2014 | |
| JP | 5432843 B2 | 3/2014 | |
| JP | 2014047528 A | 3/2014 | |
| JP | 2015122401 A | 7/2015 | |
| JP | 2019092368 A | 6/2019 | |
| JP | 2019216554 A | 12/2019 | |
| JP | 2020031455 A | 2/2020 | |
| JP | 6810329 B2 | 1/2021 | |
| KR | 100912661 B1 | 8/2009 | |
| KR | 100913073 B1 | 8/2009 | |
| KR | 101004731 B1 | 1/2011 | |
| KR | 101085523 B1 | 11/2011 | |
| KR | 101093860 B1 | 12/2011 | |
| KR | 101168672 B1 | 7/2012 | |
| KR | 101191362 B1 | 10/2012 | |
| KR | 101195862 B1 | 11/2012 | |
| KR | 101216206 B1 | 12/2012 | |
| KR | 101242410 B1 | 3/2013 | |
| KR | 101279427 B1 | 6/2013 | |
| KR | 101454217 B1 | 10/2014 | |
| KR | 101670331 B1 | 11/2016 | |
| KR | 101720669 B1 | 3/2017 | |
| KR | 101898130 B1 | 9/2018 | |
| KR | 101918717 B1 | 2/2019 | |
| KR | 102061577 B1 | 1/2020 | |
| KR | 20200023939 A | 3/2020 | |
| KR | 20200031825 A | 3/2020 | |
| WO | 2011139660 A1 | 11/2011 | |
| WO | 2012/073705 A1 | 6/2012 | |
| WO | 2014/009541 A2 | 1/2014 | |
| WO | WO-2015017676 A1 * | 2/2015 | ............ G01W 1/10 |
| WO | 2015/127804 A1 | 9/2015 | |
| WO | 2019/027080 A1 | 2/2019 | |
| WO | 2020/185271 A1 | 9/2020 | |

* cited by examiner

STOWING OF PHOTOVOLTAIC (PV) MODULES IN RESPONSE TO WEATHER EVENT FORECASTS

TECHNICAL FIELD

The present disclosure generally relates to stowing of photovoltaic (PV) modules in response to weather event forecasts for PV module system locations.

BACKGROUND

Solar farms, photovoltaic (PV) plants, and other solar energy systems where large numbers of PV modules collect sunlight and generate energy are becoming more common. However, weather events, including wind, rain, hail, and snow, can cause significant damage to the PV modules, mounting hardware, and infrastructure in PV module systems, including tracking systems. For example, snow can accumulate on the surfaces of PV modules when they are in a horizontal, or close to a horizontal, configuration. If a significant amount of snow falls, the weight of this snow can damage or even break the PV module and/or other components of the system.

Some PV module systems are tracking systems, which enable the PV modules to rotate relative to a support structure to track a location of the sun throughout the day. In these tracking systems, PV modules may be positioned in a "stow" configuration, or a configuration where the PV modules are angled in a non-horizontal position, when the location of the tracking system is experiencing a weather event. Placing the PV modules in a stow configuration may reduce the likelihood of damage to the tracking system.

However, placing PV modules in a stow configuration is a task that is often performed by a human operator manually accessing the tracking system controls. This approach is prone to human error in either properly placing the PV modules in the stow configuration or removing the PV modules from the stow configuration when the weather event has passed. This approach is also prone to unexpected delays.

Other tracking systems automatically position PV modules in a stow configuration when a weather event is detected at the location of the tracking system. These systems, which often rely on a sensor to determine if the location is experiencing a weather event, are prone to malfunction and false positive alerts. In addition, if the weather event causes a power outage, the tracking system may lack the power needed to position the PV modules into the stow configuration.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

Exemplary embodiments of the present disclosure address problems experienced in conventional tracking systems, including problems associated with damage to PV modules, mounting hardware, and infrastructure caused by weather events. Embodiments disclosed herein address this problem by obtaining and considering a weather event forecast in a decision on whether to position a PV module in a stow configuration. Specifically, in one example embodiment, a method for implementing a stow configuration for one or more PV modules may include receiving a weather event forecast for a location of a tracking system that includes one or more PV modules. When a determination is made that the weather event forecast for the location of the tracking system exceeds a threshold level of severity, the plurality of PV modules may automatically be positioned into a stow configuration. In some embodiments, the weather event forecast may include a snow event.

In another example embodiment, a system for implementing a stow configuration for one or more PV modules based on a snow event may include a tracking system comprising a PV module and a tracker drive mechanically coupled to the PV module. In this embodiment the tracker drive may be configured to rotate the PV module into and out of a stow configuration. The system may also include a sensor configured to identify a presence of snow at a location of the tracking system. Finally, the system may include a control server communicatively coupled to a weather forecast server. The control server may be configured to receive a snow event forecast for the location of the tracking system, determine that the snow event forecast exceeds a minimum threshold level of severity, receive confirmation of a presence of snow from the sensor at the location of the tracking system, and automatically position the PV module into the stow configuration. The control server may be configured to receive a snow event forecast for the location of the tracking system, determine that the snow event forecast exceeds a higher threshold level of severity, and automatically position the PV module into the stow configuration, regardless of the data from the sensor at the location of the tracking system.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the accompanying drawings in which.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
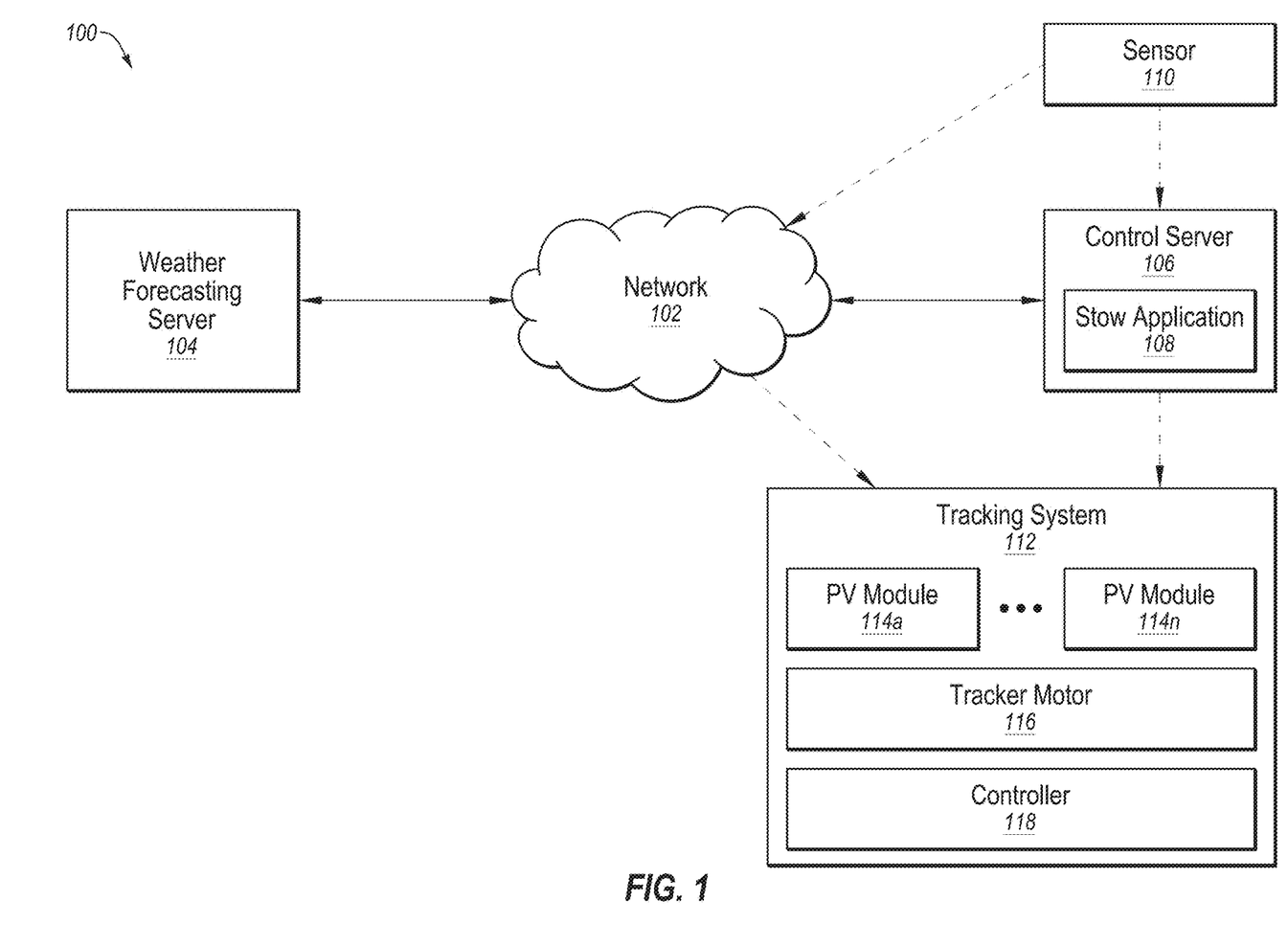
FIG. 1 illustrates an exemplary system for stowing one or more PV modules in response to a weather event forecast.

FIG. 1 illustrates an exemplary system 100 for stowing one or more PV modules in response to a weather event forecast. The system 100 includes a network 102, a weather forecasting server 104, a control server 106, a sensor 110, and a tracking system 112.

The network 102 may be configured to communicatively couple the weather forecasting server 104, the control server 106, the sensor 110, and the tracking system 112. In some embodiments, the network 102 may be any wired or wireless network, or combination of multiple networks, configured to send and receive communications between systems and devices. The network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 5:
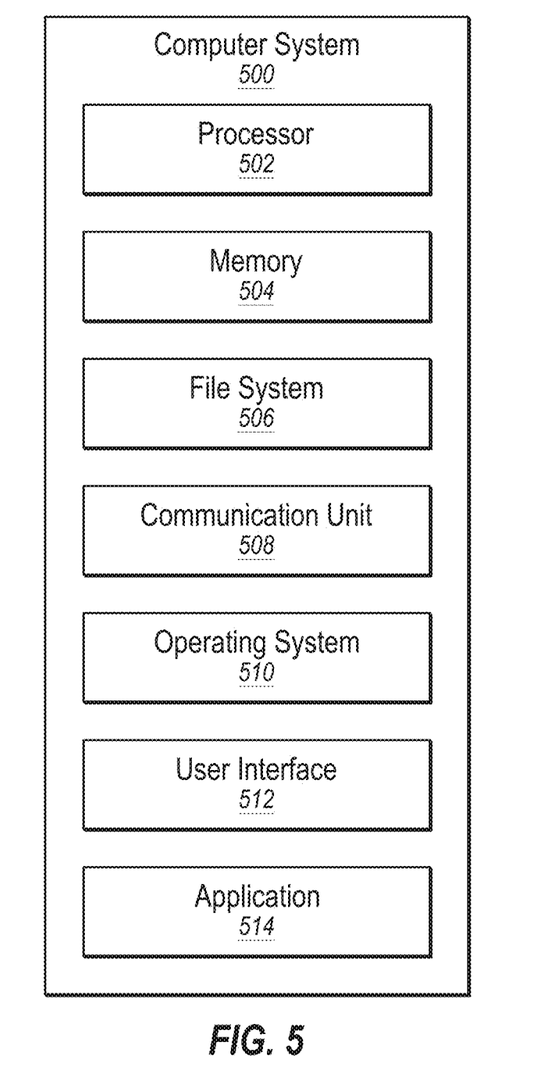
FIG. 5 illustrates an example computer system that may be employed in stowing one or more PV modules in response to a weather event forecast.

In some embodiments, the weather forecasting server 104 may be any computer system capable of providing location specific weather event forecasts over the network 102, examples of which are disclosed herein in connection with the computer system 500 of FIG. 5. Weather event forecasts that the weather forecasting server 104 provide may identify a type of weather event forecast. For example, the weather forecasting server 104 may identify rain, snow, hail, wind, lightning, or some other weather condition as the forecasted weather event. In addition, the weather forecasting server 104 may identify a level of severity that is anticipated for the weather event. A level of severity may be an amount of rain or snow, a size of hail, an average velocity of wind, top wind gust velocities, a risk of power outage, etc. Further, the weather forecasting server 104 may identify a forecasted start time of the weather event for specific locations, as well as a forecasted duration or end time of the weather event for the specific locations.

In some embodiments, the sensor 110 may be configured to identify an active weather event. For example, in one embodiment, the sensor 110 may be configured to detect a presence of snow, rain, lightning, or wind. The sensor 110 may be configured to determine an accumulation, or a depth, of snow, a speed of wind, an amount of rain that has fallen, the presence of lightning, or distance of a lightning strike. With regard to a snow, the sensor 110 may be an ultrasonic snow sensor that sends pulses of ultrasound waves toward the ground to calculate the distance to the ground by measuring the time for reflected waves to return. In other embodiments, the sensor 110 may be a laser-based sensor. The sensor 110 may be positioned in sufficiently close proximity to the tracking system 112 that the sensor 110 and the tracking system 112 are experiencing the same weather event. For example, the sensor 110 may be positioned within 100 yards of the tracking system 112 so that weather data collected by the sensor 110 is representative of weather conditions at the tracking system 112 as well.

In some embodiments, the sensor 110 may be configured to communicate sensed data to the control server 106 through the network 102. In other embodiments, the sensor 110 may not be connected to the network 102. In these embodiments, the sensor 110 may be communicatively coupled to the control server 106 through a local wired or wireless communication link. For example, in one embodiment, the sensor 110 may be communicatively coupled to the control server 106 via a wireless connection, such as a Bluetooth connection.

In some embodiments, the tracking system 112 includes a plurality of PV modules 114a-114n, a tracker motor 116, and a controller 118. The PV modules 114a-114n may include solar panels that are configured to convert sunlight into power. An angular orientation of the PV modules 114a-114n may be adjustable in order to enable the PV modules to track a location of the sun throughout the day. The tracker motor 116 may be mechanically coupled to the PV modules 114a-114n to selectively adjust the angular orientation of the PV modules 114a-114n. In addition to tracking the location of the sun, the tracker motor 116 may position the PV modules 114a-114n into a stow configuration. A stow configuration may be a configuration in which the PV modules are angled in a non-horizontal position. In some embodiments, the stow configuration may be the largest angular position, or close to the largest angular position, that is possible for the tracker motor 116 and PV modules 114a-114n. For example, the angular configuration for PV modules in a stow configuration may be between 50 and 55 degrees from horizontal.

The controller 118 may control the tracker motor 116 and the angular position of the PV modules 114a-114n. For example, the controller 118 may provide instructions to the tracker motor 116 to position the PV modules 114a-114n into a stow configuration, or to remove the PV modules 114a-114n from the stow configuration. The tracking system 112 is communicatively coupled to the control server 106 to receive these instructions from the control server 106. In some embodiments, the tracking system 112 may be configured receive these instructions through the network 102. In other embodiments, the tracking system 112 may not be connected to the network 102. In these embodiments, tracking system 112 may be communicatively coupled to the control server 106 through a local wired or wireless communication link. For example, in one embodiment, the tracking system 112 may be communicatively coupled to the control server 106 via a wireless connection, such as a Bluetooth connection.

In some embodiments, the control server 106 may be any computer system capable of receiving weather event forecasts over the network 102, examples of which are disclosed herein in connection with the computer system 500 of FIG. 5. The control server 106 includes a stow application 108. The stow application 108 may receive weather event forecasts from the weather forecasting server 104 through an application programming interface (API) request sent by the control server 106 to the weather forecasting server 104. The stow application 108 may also receive data, as provided above, from the sensor 110. The stow application 108 may be configured to evaluate data from the weather forecasting server 104 and/or the sensor 110 to determine if the PV modules 114a-114n should be positioned in the stow configuration.

In one embodiment, the stow application 108 may determine if a threshold level of severity is met based on a weather event forecast received from the weather forecasting server 104 alone. In this embodiment the stow application 108 may compare a level of severity of a weather event forecast for a location of the tracking system 112 to a threshold level of severity. This threshold level of severity may be an amount of rain or snow, a size of hail, an average velocity of wind, top wind gust velocities, a likelihood of power outage, etc. If the level of severity of the weather event forecast meets or exceeds threshold level of severity, the stow application 108 may communicate an instruction to the controller 118 to position the PV modules 114a-114n in the stow configuration.

In another embodiment, the stow application 108 may determine if a threshold level of severity is met based on data received from the sensor 110 alone. In this embodiment, the stow application 108 may compare an actual level of severity of a weather event at the location of the tracking system 112, as measured by the sensor 110, to a threshold level of severity. This threshold level of severity may be an actual amount of rain or snow, a size of hail, an average velocity of wind, top wind gust velocities, a lightning strikes, etc. If the actual level of severity of the weather event meets or exceeds the threshold level of severity, the stow application 108 may communicate an instruction to the controller 118 to position the PV modules 114a-114n in the stow configuration.

In yet another embodiment, determining if a threshold level of severity is met may be based on a combination of data from the weather forecasting server 104 and data from the sensor 110. For example, a threshold level of severity may require a weather event forecast to exceed a certain amount of snow and that an actual accumulation of snow, sensed by the sensor 110, at the location of the tracking system 112 be present in order to trigger an instruction to position the PV modules 114a-114n in the stow configuration.

The stow application 108 may further identify, based on the weather event forecast and/or data from the sensor 110, a time at which to instruct the controller 118 to position the PV modules 114a-114n in the stow configuration, and a time at which to instruct the controller 118 to remove the PV modules 114a-114n from the stow configuration. For example, the if the weather event forecast includes a start time and an end time of the forecasted weather event, the stow application 108 may communicate instructions to the controller 118 to position the PV modules 114a-114n in the stow configuration at or prior to the forecasted start time of the weather event. Similarly, the stow application 108 may communicate instructions to the controller 118 to remove the PV modules 114a-114n from the stow configuration at or after the forecasted end time of the weather event.

In another embodiment, if the weather event forecast includes a risk of lightning or a power outage, the stow application 108 may communicate instructions to the controller 118 to position the PV modules 114a-114n in the stow configuration prior to the forecasted start time of the weather event. For example, the stow application 108 may communicate instructions to the controller 118 to position the PV modules 114a-114n in the stow configuration 30 minutes prior to the forecasted start time of the weather event if the weather event includes a risk of a power outage. Placing the PV modules 114a-114n in the stow configuration prior to the forecasted start time of the weather event avoids scenario where power at location of tracking system is out based on a lightning strike or other event electrical event at a different location.

The stow application 108 may also evaluate data from the sensor 110 to determine when to position the PV modules 114a-114n in the stow configuration and when to remove the PV modules 114a-114n from the stow configuration. For example, the stow application 108 may wait until an actual accumulation of snow is present at the location of the tracking system 112 before an instruction is sent to position the PV modules 114a-114n in the stow configuration. In another embodiment, if the sensor 110 senses a lightning strike, the stow application 108 may immediately position the PV modules 114a-114n in the stow configuration.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, a system for stowing one or more PV modules in response to a weather event forecast may not include a sensor. In these embodiments, a decision on whether to position one or more PV modules may be based on a forecast received from a weather forecasting server alone. In another embodiment, a system for stowing one or more PV modules in response to a weather event forecast may not include a connection to a weather forecasting server. In these embodiments, a decision on whether to position one or more PV modules may be based on a sensor alone.

Figure 2A:
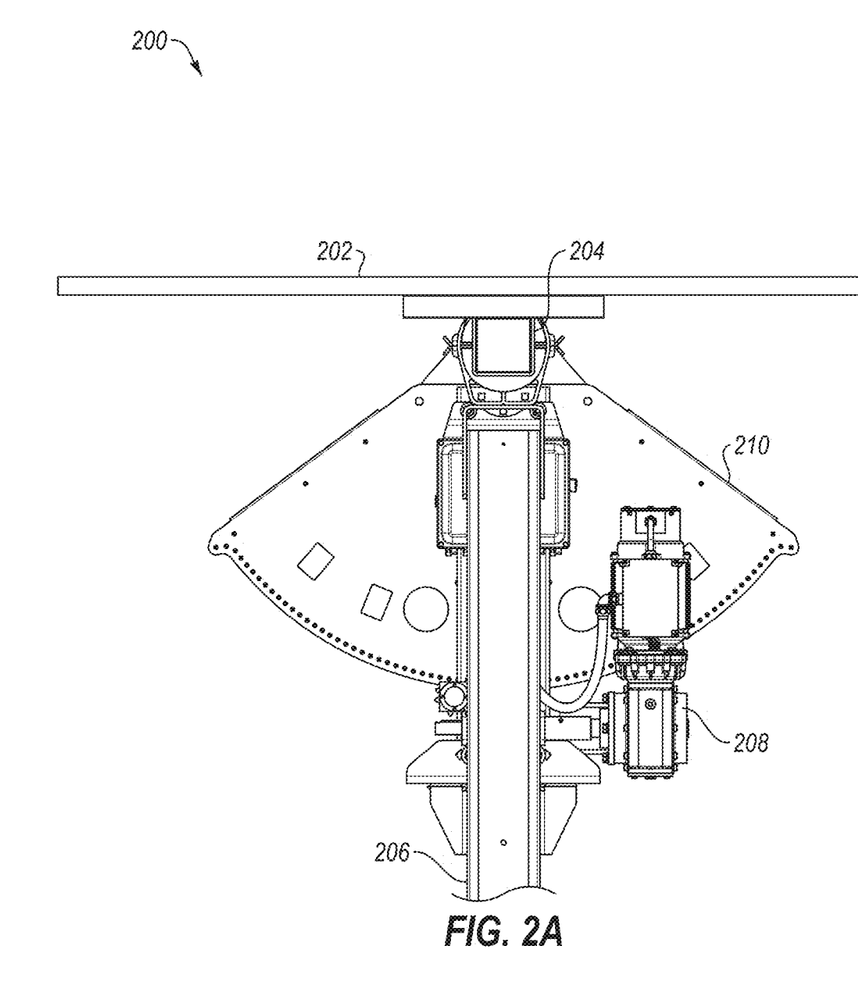
FIG. 2A illustrates a side view of a tracking system that is not in a stow configuration.
Figure 2B:
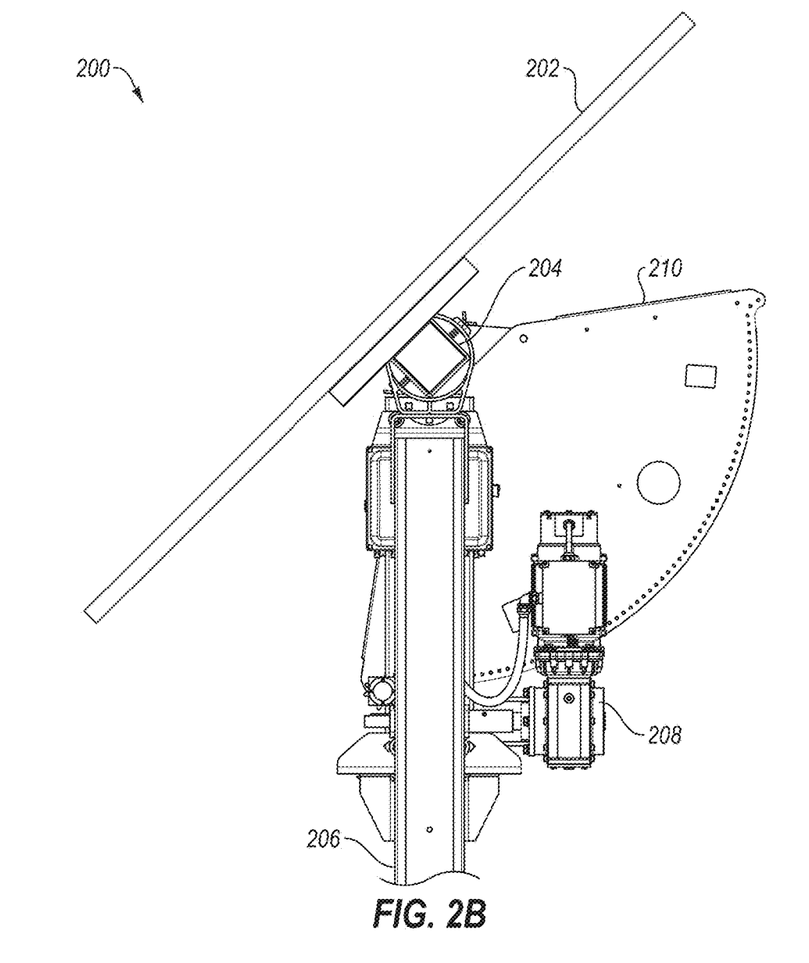
FIG. 2B illustrates a side view of a tracking system that is in a stow configuration.

FIGS. 2A and 2B illustrate a side view of a tracking system 200. The tracking system 200 includes a PV module 202 that is coupled to a torque tube 204. The torque tube is coupled to a support structure 206 in a way that allows the torque tube 204 and the PV module 202 to rotate relative to the support structure 206. A tracker motor 208 is mechanically coupled to the torque tube through a spur gear 210. The tracker motor 208 is configured to change an angular orientation of the PV module 202 relative to the support structure 206. The tracking system 200 may also include a controller (not shown) and may be similar to the tracking system 112 of FIG. 1.

In FIG. 2A, the tracker motor 208 has positioned the PV module 202 in a generally horizontal configuration, which is ideal for generating energy when the sun is directly overhead. In FIG. 2B, the tracker motor 208 has positioned the PV module 202 into a stow configuration, in which the PV module 202 is not horizontal, but at an angle relative to horizontal. In some embodiments, the stow configuration may be the largest tilt angle or close to the largest tilt angle that motor 208 is capable of positioning the PV module 202. In some embodiments, a stow configuration may be between 50 and 55 degrees from horizontal.

In a stow configuration, snow may not be able to accumulate on the surface of the PV module 202. Due to the angle of the PV module 202, during a snow event, snow may simply slip off the lower edge of the PV module, thus preventing damage to the PV module and other components of the tracking system 200 that may result from the weight of snow accumulation on the top of the PV module 202.

The tracking system 200 may also include a communication mechanism (not shown) through which it may receive instructions for controlling the tracker motor 208 and the PV module 202. This communication mechanism may be a wired or wireless communication link. In some embodiments, the tracking system 200 may communicate through the Internet. In other embodiments, the tracking system 200 may communicate through a local communication link, such as a wired or local wireless link, such as a Bluetooth link.

Figure 3:
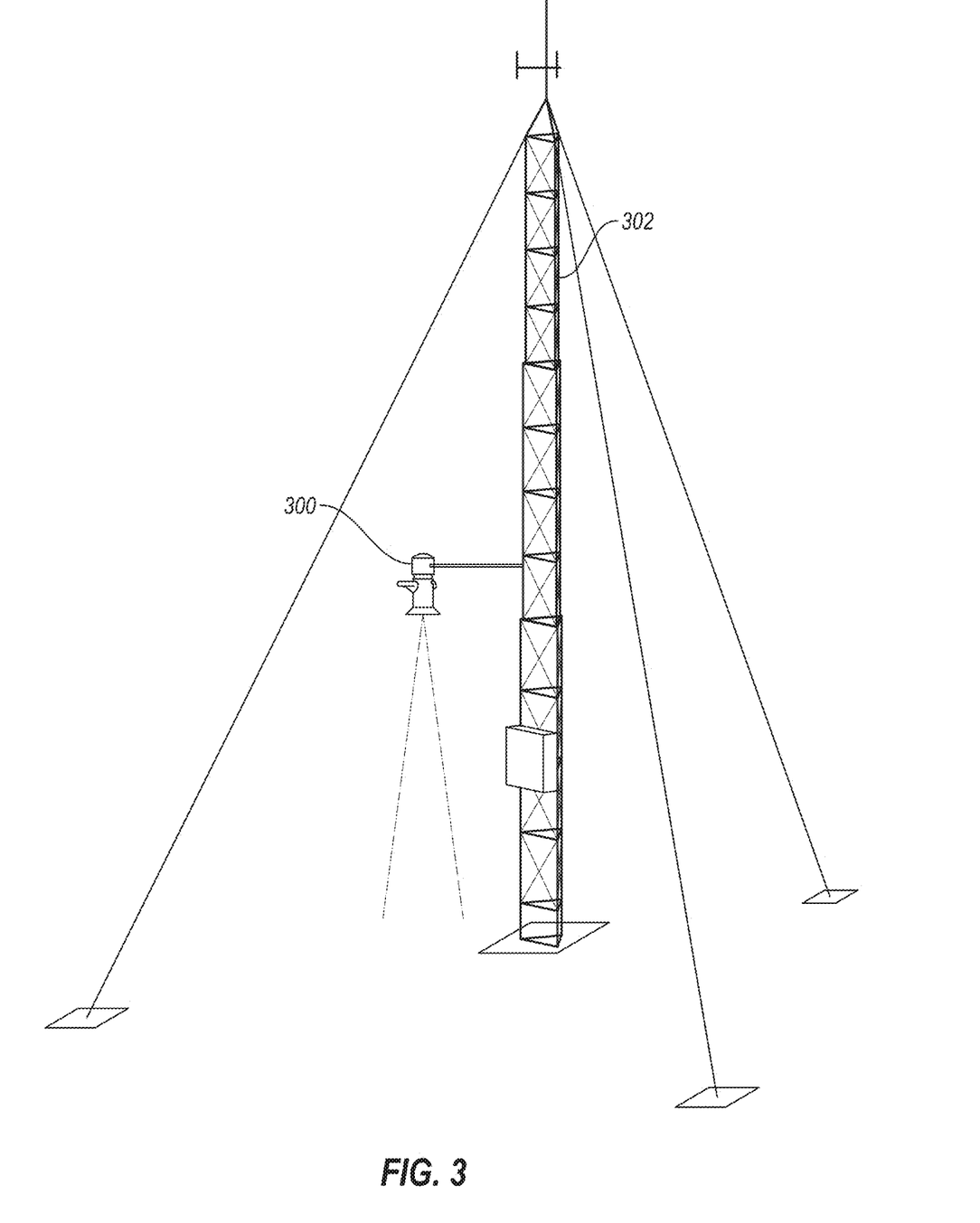
FIG. 3 illustrates an exemplary sensor.

FIG. 3 illustrates an exemplary sensor 300. The sensor 300 may be mounted at some distance above the ground on a structure 302. The structure 302 may support other components of a weather station, such as a thermometer for measuring air temperature, a barometer for measuring atmospheric pressure, a hygrometer for measuring humidity, and an anemometer for measuring wind speed. The sensor 300 may be configured to measure a distance from the sensor to the ground in order to determine whether snow is present. The sensor 300 may also determine an accumulation, or an amount of snow on the ground. In some embodiments, the sensor 300 may be an ultrasonic snow sensor that sends pulses of ultrasound waves toward the ground to calculate the distance to the ground by measuring the time for reflected waves to return. In other embodiments, the sensor 300 may be a laser-based sensor.

The sensor 300 may also include a communication mechanism (not shown) through which it may send data that it collects to an outside system for evaluation. This communication mechanism may be a wired or wireless communication link. In some embodiments, the sensor 300 may communicate through the Internet. In other embodiments, the sensor 300 may communicate through a local communication link, such as a wired or local wireless link, such as a Bluetooth link.

Figure 4:
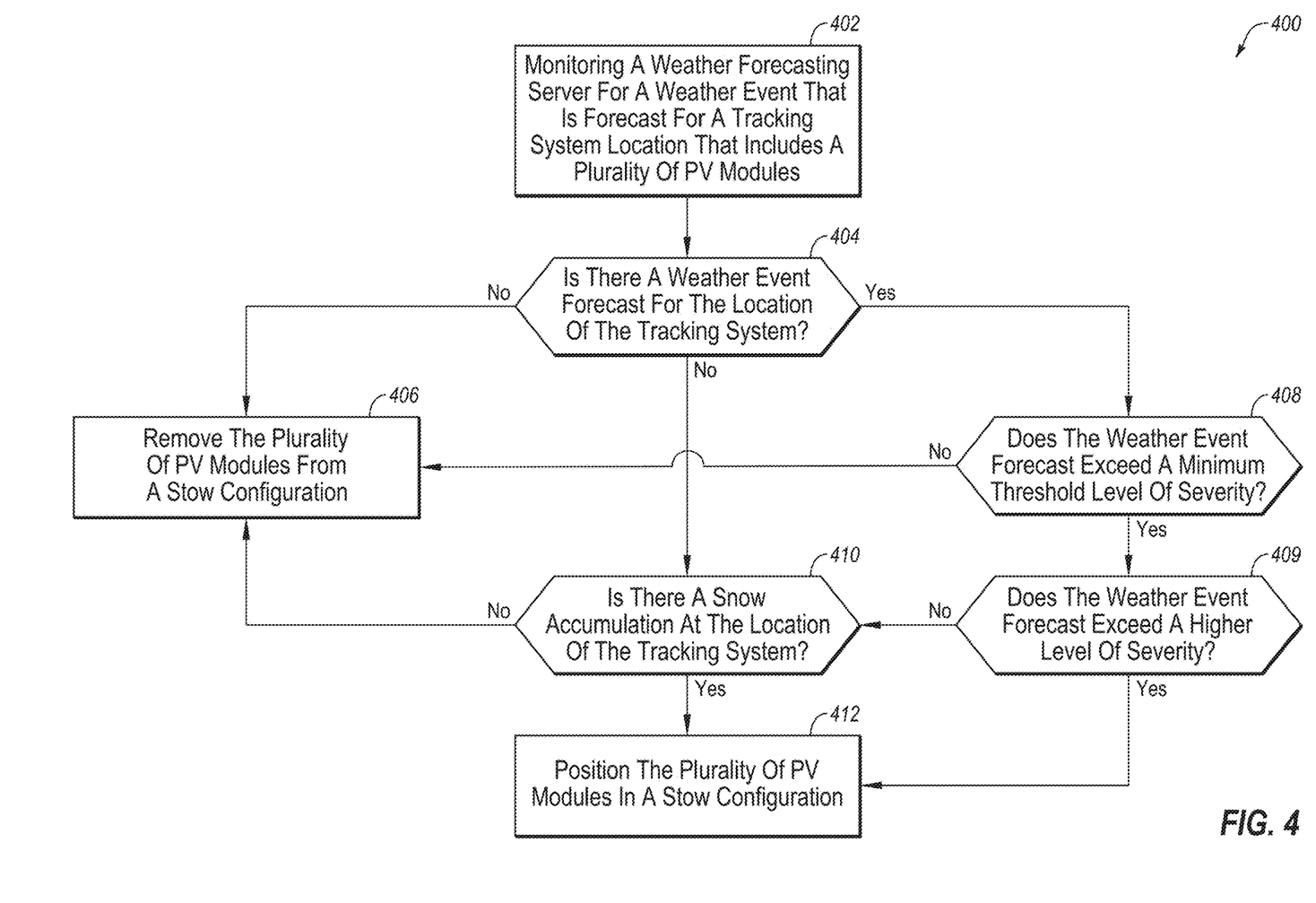
FIG. 4 illustrates a flow diagram of an example method for stowing one or more PV modules in response to a weather event forecast.

FIG. 4 illustrates a flow diagram of an example method 400 for stowing one or more PV modules in response to a weather event forecast. The method 400 may be performed, in some embodiments, by a device or system, such as by the stow application 108 of FIG. 1. In these and other embodiments, the method 400 may be performed by one or more processors based on one or more computer-readable instructions stored on one or more non-transitory computer-readable media.

The method 400 may include, at action 402, monitoring a weather forecast server, such as the weather forecast server 104 in FIG. 1, for a weather event that is forecast for a tracking system location that includes a plurality of PV modules.

The method 400 may include, at action 404, determining if there a weather event forecast for the location of the tracking system. In one embodiment, if there is not a weather event forecast for the location of the tracking system, the method 400 may either ensure that the plurality of PV modules is not in a stow configuration or remove the plurality of PV modules from a stow configuration at action 406.

In some embodiments, in addition to a weather event forecast, data relating to actual weather conditions at the location that includes a plurality of PV modules may also be received and evaluated. For example, if there is not a weather event forecast for the location of the tracking system, the method 400 may determine if there is a snow accumulation at the location of the tracking system at action 410. This data may be received from a sensor that is positioned at the location of the tracking system. If the sensor confirms a lack of snow the method 400 may either ensure that the plurality of PV modules is not in a stow configuration or remove the plurality of PV modules from a stow configuration at action 406. Alternatively, if there is a snow accumulation identified at the location of the tracking system at action 410, the plurality of PV modules may be placed in a stow configuration at action 412.

If there is a weather event forecast for the location of the tracking system, the severity of the weather event can be compared to a minimum threshold level of severity at action 408. If it is determined that the weather event forecast does not exceed a minimum threshold level of severity, the method 400 may either ensure that the plurality of PV modules is not in a stow configuration or remove the plurality of PV modules from a stow configuration at action 406.

If it is determined that the weather event forecast exceeds a minimum threshold level of severity, a determination may be made as to whether the weather event forecast exceeds a higher threshold level of severity at action 409. In some embodiments, a higher threshold level of severity may indicate a more significant storm than a storm forecast that falls between the minimum threshold level of severity and the higher threshold level of severity. The higher threshold level of severity may include a larger forecasted accumulation total of snow or rain, a higher forecasted wind speed, or a higher forecasted of a power outage likelihood that a storm forecast that falls between the minimum threshold level of severity and the higher threshold level of severity. If the weather event forecast exceeds the higher threshold level of severity, the plurality of PV modules may be positioned in a stow configuration at action 412 without any confirmation from any on-site sensor.

Alternatively, if the weather event forecast does not exceed the higher threshold level of severity, data relating to actual weather conditions at the location that includes a plurality of PV modules may also be received and evaluated. For example, if a snow event forecast for the location of the tracking system has a severity higher than the minimum threshold level of severity but lower than the higher threshold level of severity (for example, there is no risk of a power outage or accumulation totals fall below the higher threshold level of severity), the method 400 may determine if there is an accumulation of snow at the location of the tracking system at action 410 from an on-site sensor. If the sensor confirms the presence of snow or a certain accumulation of snow, the plurality of PV modules may then be positioned in a stow configuration at action 412. If the sensor does not confirm the presence of snow or a certain accumulation of snow, the method 400 may either ensure that the plurality of PV modules is not in a stow configuration or remove the plurality of PV modules from a stow configuration at action 406.

FIG. 5 illustrates an example computer system 500 that may be employed in stowing one or more PV modules in response to a weather event forecast. In some embodiments, the computer system 500 may be part of any of the systems or devices described in this disclosure. For example, the computer system 500 may be part of any of the weather forecasting server 104 and the control server 106 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the methods disclosed herein.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the methods disclosed herein. These computer-executable instructions may be included, for example, in the operating system 510, in one or more applications, such as the stow application 108 of FIG. 1.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more of the actions of the methods disclosed herein. In some embodiments, the application 514 may be part of the operating system 510 or may be part of an application of the computer system 500, or may be some combination thereof. In some embodiments, the application 514 may function as the stow application 108 of FIG. 1.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system for stowing one or more photovoltaic (PV) modules based on a snow event forecast, the system comprising:
    a tracking system comprising a PV module and a tracker drive mechanically coupled to the PV module, the tracker drive being configured to position the PV module into a stow configuration;
    a sensor configured to identify a presence of snow at a location of the tracking system; and
    a control server communicatively coupled to a weather forecast server, the control server being configured to:
        receive a snow event forecast for the location of the tracking system,
        determine that the snow event forecast exceeds a threshold level of severity,
        receive, from the sensor, information regarding an amount of snow at the location of the tracking system,
        determine that the amount of snow at the location of the tracking system exceeds a threshold amount of snow, and
        automatically position the PV module into the stow configuration based on the snow event forecast exceeding the threshold level of severity and the amount of snow at the location of the tracking system exceeding the threshold amount of snow.

2. The system of claim 1, wherein the snow event forecast includes a forecasted start time of the snow event and a forecasted end time of the snow event.

3. The system of claim 2, wherein the PV module is automatically removed from the stow configuration at or after the forecasted end time of the snow event.

4. The system of claim 1, wherein the threshold level of severity includes whether the snow event forecast presents a possibility of a power outage.

5. The system of claim 1, wherein the threshold level of severity includes a forecast of an accumulation total of snow.

6. The system of claim 1, wherein the stow configuration is between 50 and 55 degrees from horizontal.

7. The system of claim 1, wherein the sensor is an ultrasonic snow sensor that is configured to send pulses of ultrasound waves toward a ground surface to calculate the distance to the ground surface by measuring a time for reflected waves to return.

8. The system of claim 1, wherein the sensor is a laser based sensor.

9. The system of claim 1, wherein the sensor is communicatively coupled to the control server through a wired communication link.

10. The system of claim 1, wherein the sensor is communicatively coupled to the control server through a wireless communication link.

11. The system of claim 10, wherein the wireless communication link includes a Bluetooth connection.

* * * * *